United States Patent [19]
Cahill et al.

[11] Patent Number: 5,604,313
[45] Date of Patent: Feb. 18, 1997

[54] VARYING APPARENT MASS ACCELEROMETER

[75] Inventors: Sean S. Cahill, Palo Alto, Calif.; Kenichi Nakamura, Tokyo, Japan

[73] Assignee: Tokyo Gas Co., Ltd., Tokyo, Japan

[21] Appl. No.: 346,263

[22] Filed: Nov. 23, 1994

[51] Int. Cl.[6] ............... G01P 15/00; G01P 15/125; H01G 7/00
[52] U.S. Cl. ................ 73/514.38; 73/514.16; 73/514.32; 361/283.2
[58] Field of Search ............... 73/517 AV, 514.18, 73/514.24, 514.32, 514.38, 514.16, 514.35; 361/280, 283.1, 283.2

[56] References Cited

U.S. PATENT DOCUMENTS

| | | | |
|---|---|---|---|
| 3,723,866 | 3/1973 | Michaud et al. | 361/280 |
| 4,928,203 | 5/1990 | Swindal et al. | 73/517 AV |
| 4,930,043 | 5/1990 | Wiegand | 73/517 AV |
| 5,006,487 | 4/1991 | Stokes | 73/517 AV |
| 5,078,220 | 1/1992 | Briefer | 361/280 |
| 5,101,669 | 4/1992 | Holm-Kennedy et al. | 361/280 |
| 5,337,606 | 8/1994 | Bennett et al. | 73/514.32 |
| 5,392,650 | 2/1995 | O'Brien et al. | 73/517 AV |
| 5,417,312 | 5/1995 | Tsuchitani et al. | 73/517 AV |

*Primary Examiner*—Hezron E. Williams
*Assistant Examiner*—Richard A. Moller
*Attorney, Agent, or Firm*—Armstrong, Westerman, Hattori, McLeland & Naughton

[57] ABSTRACT

A varying apparent mass accelerometer 1 for detecting earthquake vibrations includes a frame 2 vibrating with an earthquake wave, a mass 51 supported on the frame 2 via a spring 52, electrodes 6 and 7 disposed above and below the mass 51, power sources 8 each applying a voltage across the electrodes 6 and 7, and a capacitance detector 9 for detecting changes in capacitance between the electrodes. The accelerometer 1 exerts a signal only when an acceleration exceeds a threshold.

3 Claims, 9 Drawing Sheets

$V_0 > V_1 > V_2 < V_3$

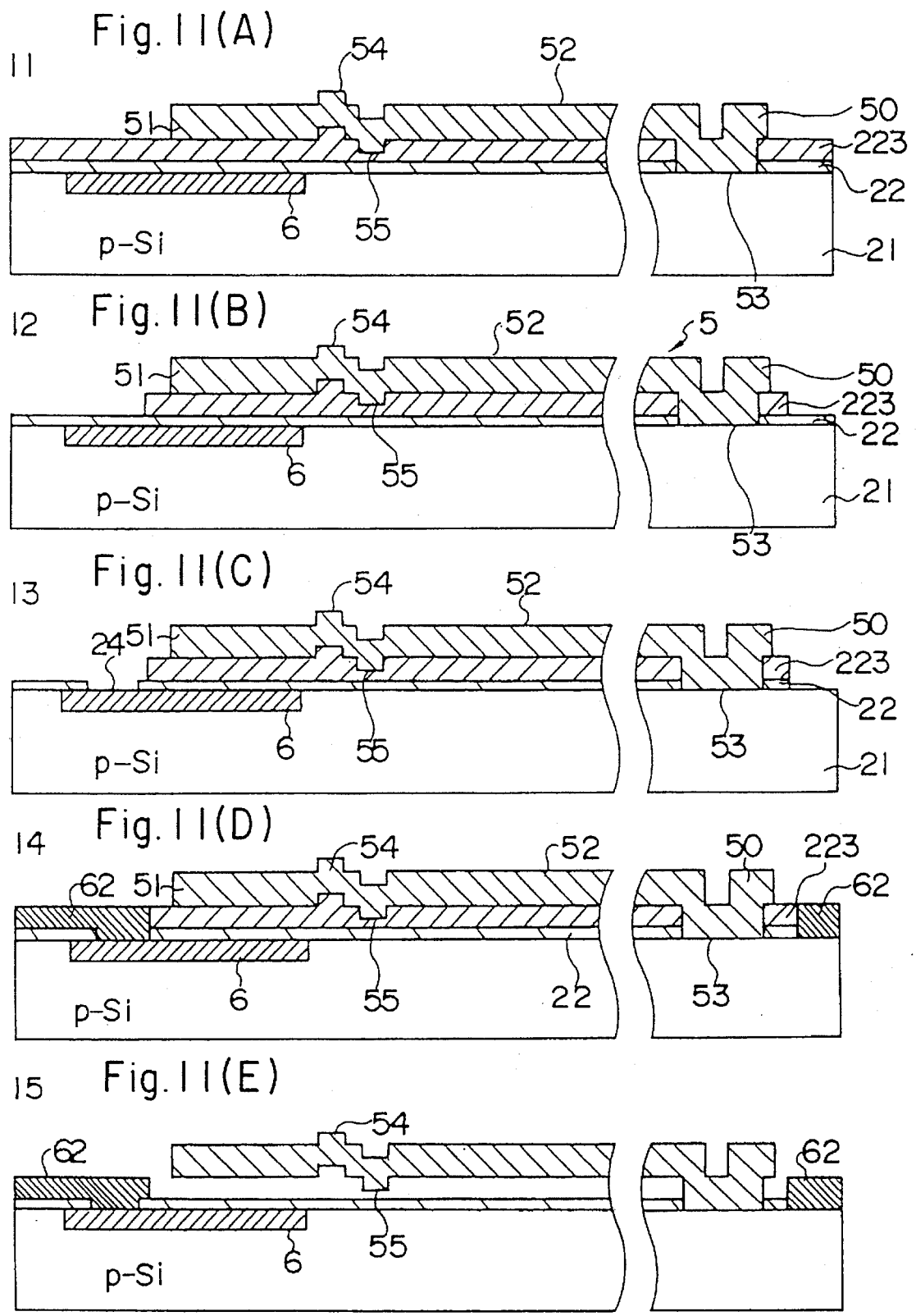

VARYING APPARENT MASS ACCELEROMETER

BACKGROUND OF THE INVENTION

1. Field of the Invention

This invention relates to a micro-accelerometer made by micromachining techniques and used to detect vibrating waves. The invention is preferably related to a miniaturized accelerometer for detecting earthquake waves.

2. Description of the Prior Art

Individual terminals of a gas supply network must be shut quickly and reliably in the event of large-scaled earthquakes. For this purpose, an earthquake sensor is equipped to each user's terminal of the network to detect earthquakes and to shut the terminal in response to a detection signal.

Existing accelerometers for detecting earthquakes can be classified into two types: one of a broad band type using a small vibrator and capable of detecting vibrations over broad bands and the other of a narrow band type whose frequency characteristics are limited to low frequencies so as to detect only earthquake frequencies. These accelerometers have arrangements in which a mass is connected to a frame via a spring or other resilient member so as to detect acceleration in terms of changes in relative position between the mass and the frame.

In order to implement a low resonant frequency to an existing narrow band accelerometer designed to detect only earthquake waves which have low frequencies, the accelerometer itself must have a large dimension. If acceleration of 100 Gal for the frequency of 1 Hz is to be detected, displacement of the accelerometer as large as 2.5 cm is required. For allowing such a large displacement in a linear system, its vibrator must be, at least, as long as the length of the displacement.

Existing wide band accelerometers have quite high band resonant frequencies, typically 1000 Hz or more, causing the accelerometers to recognize traffic or other vibrations as earthquakes. In order to overcome the problem, they need an electric filter for removing high frequency components from detection signals so as to extract only earthquake signals.

FIG. 12 shows a basic structure of an earthquake sensor currently used in gas meters. The earthquake sensor 100 uses a steel ball 150 housed in a container 110 having a funnel-like cavity 130 in the center of its bottom 120. When an acceleration is applied to the container 110, the steel ball 150 runs up the slope 131 of the cavity 130, and touches an electrode 141 provided on the circumferential wall 140 of the container 110, thus short-circuiting the electrode 141 and another electrode 121 at the bottom, causing a signal indicating application of an acceleration above a predetermined value to be exerted.

This acceleration sensor exhibits the characteristics shown in FIG. 13 indicating acceleration (Gal) on the ordinate and displacement (mm) on the abscissa. That is, when inner diameter of the container 110 is 21.6 mm, diameter of the steel ball 150 is 15.9 mm, and angle $\alpha$ of the slope of the cavity 130 is 6.42 degrees, the steel ball moves by 2.477 mm at the acceleration of $(5/7) \cdot M \cdot g \cdot \sin\alpha \cdot \cos\alpha$ and causes a detection signal to be exerted. In the equation, M is mass of the ball, and g is gravitational acceleration.

An accelerometer used as a seismograph requires sensitivity to accelerations of 85 to 150 Gal for frequencies between 1 and 5 Hz, and requires a roll-off (decrease in sensitivity) of approximately 60 dB per decade above 5 Hz.

The general shape of the ideal force-displacement characteristic is shown in FIG. 4 indicating restoring force on the ordinate and displacement on the abscissa. This force-displacement characteristic describes that the spring is very stiff at small accelerations, which causes the mass to move together with the frame, resulting in no relative displacement between the mass and the frame. When the threshold acceleration is reached, causing the threshold force (seismic mass×threshold acceleration) to be exceeded, the spring becomes soft, which causes a relative displacement between the frame and the mass.

In order that a detector element does not largely deform when an earthquake acceleration is applied, the detector element must be small, and the use of micromachining techniques to make such accelerometers would be advantageous. In addition, such accelerometers themselves for detecting earthquake waves must have a narrow detection bandwidth of approximately 1 to 5 Hz to eliminate the need for an expensive low pass electric filter.

To meet these requirements, the spring must be stiff before an incoming earthquake acceleration slightly exceeds the system threshold, and must change in characteristics to become soft when the threshold is exceeded. By implementing this feature, the detection bandwidth relative to a large acceleration near the threshold can be narrowed.

OBJECT OF THE INVENTION

It is therefore an object of the invention to provide a miniaturized, inexpensive and low power-consumptive accelerometer having sensitivity to accelerations of 85 to 150 Gal for frequencies between 1 to 5 Hz, and a roll-off of approximately 60 dB per decade above 5 Hz.

Another object of the invention is to provide an accelerometer which exerts a signal only when an acceleration exceeds a threshold.

SUMMARY OF THE INVENTION

Normally the mass supported on a frame through a spring in any accelerometer or vibration sensor experiences two forces. First, there are the forces due to acceleration, such as external acceleration, which are transferred to the mass via its suspension and which the sensor is designed to detect. Second, there are the repulsive forces against displacement caused by gravity or the like (inertial force to rest). By introducing a third type of force with which the repulsive forces transferred to the mass via its suspension appear to vary in strength as the displacement of the mass in the accelerometer varies, a device having the property of varying apparent mass in which the mass appears to have changed may be constructed. That is, a force varying with displacement of the mass may be imposed to the mass of an accelerometer to vary the apparent mass as the third force. If this third force is implemented, then the system is caused to have the characteristics desired in an earthquake accelerometer.

Such a varying apparent mass accelerometer capable of imparting the third force according to the invention includes a frame vibrating with vibrating waves, a mass supported on a frame via a spring, and electrodes disposed above and below the mass.

The varying apparent mass accelerometer according to the invention may include a frame vibrating with a vibrating wave, a mass supported on the frame via a spring, electrodes disposed above and below the mass, and power sources for supplying voltages to the electrodes.

The varying apparent mass accelerometer according to the invention may include a frame vibrating with a vibrating wave, a mass supported on the frame via a spring, electrodes disposed above and below the mass, power sources for supplying voltages to the electrodes, and capacitance detecting means for detecting changes in capacitance between the electrodes.

When the mass supported on the frame via the spring lies in an electric field produced between the electrodes disposed above and below the mass, the mass experiences a force that holds the mass in between the electrodes. Therefore, this force causes the spring to behave as if being a stiff spring strong enough to prevent relative displacement between the frame and the mass during small accelerations but to behave as if being a soft spring when the acceleration exceeds the threshold and overcomes the holding force, which permits the mass to move to regions where the influence of the electric field is small. Thus the accelerometer detects vibrating waves of magnitudes in excess of a predetermined value intensive enough to cause relative displacement of the frame and the mass. Since capacitance between the electrodes varies with the presence or absence of a conducting slab between the electrodes, application of an acceleration above the threshold can be detected in terms of a change in capacitance between the electrodes.

In addition, since the sensor has the property that once the mass comes out of the center, it quickly moves to an end, a limiter switch for example, may be provided at an end of the sensor (outer side in the vibrating direction of the mass) so that application of an acceleration above the threshold can be detected by contact of the mass with the limiter switch.

BRIEF DESCRIPTION OF THE DRAWING

FIGS. 11A to 11E are diagrams showing a process sequence subsequent to that of FIGS. 10A to 10E;

DETAILED DESCRIPTION OF THE PREFERRED EMBODIMENTS

First explained is the principle of behaviors of systems according to the invention. A linear spring mass damper system supporting a mass with a spring is described by the equation $$mX''+cX'+kX=0 \tag{1}$$

where m is the mass, c the damping coefficient, and k the spring constant.

It is impossible with such a system to realize a sensor in which the mass itself varies. However, since the secondary differential term, the first term on the left side of Equation (1), indicating an acceleration has a magnitude of force, this can be varied to change the apparent mass. Therefore, if the apparent acceleration can be varied, it is possible to obtain a varying apparent mass required for realizing a varying apparent mass accelerometer. Explained below is how to vary the apparent acceleration by using an electrostatic force in order to vary the apparent mass.

Figure 5:
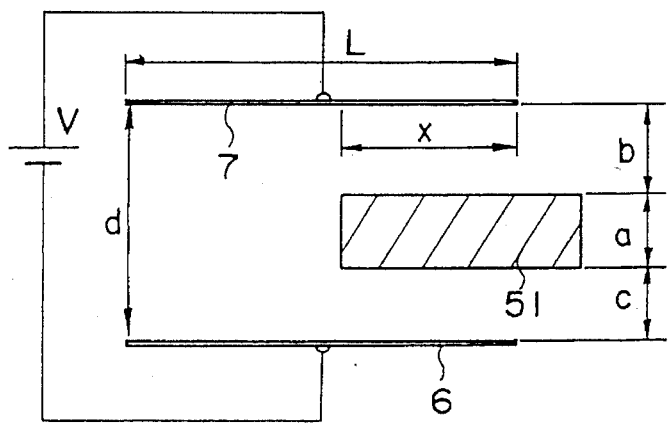
FIG. 5 is a diagram showing a principle of behaviors of the varying apparent mass accelerometer.

FIG. 5 is a diagram showing the principle of the varying apparent mass accelerometer. When a slab 51 of conductor is introduced between a lower electrode 6 and an upper electrode 7 of a capacitor, then the entire capacitance and energy vary. A force Fx in the x-direction can be expressed as $$Fx=(V^2/2)\cdot(dC/dx) \tag{2}$$

where V is the voltage across the capacitor, C is the electrostatic capacitance, and the mass 51 does not have an applied potential but is allowed to float electrically.

When a constant voltage is applied to the entire geometry of the electrodes, the Equation (2) evaluates to $$Fx=(V^2/2)\cdot[a/(d-a)]\cdot[(\epsilon\cdot A)/(L\cdot d)] \tag{3}$$

where d is the electrode spacing, L the length of the electrodes 6, 7, a the thickness of the conducting slab 51, x the lateral length of a part of the conducting slab 51 inserted in the capacitor, and A the area of each electrode 6, 7.

That is, the force applied to the conducting slab 51 becomes constant regardless of the lateral displacement x, and the electrostatic force imparted to the conducting slab 51 varies in proportion to the voltage V applied. In addition, the force is independent of vertical position of the slab to first order. By using the electrostatic force, the mass of the varying apparent mass accelerometer can be changed effectively. That is, it results in imparting a third force to the mass, in addition to acceleration to be detected and a repulsive force due to gravity.

Figure 6:
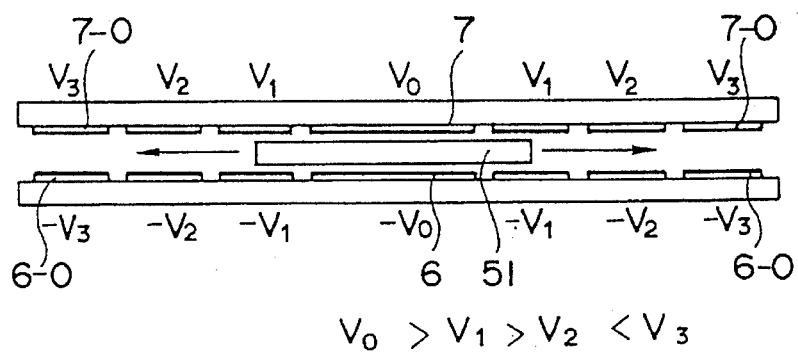
FIG. 6 is a diagram showing a status of applied voltages.
Figure 7:
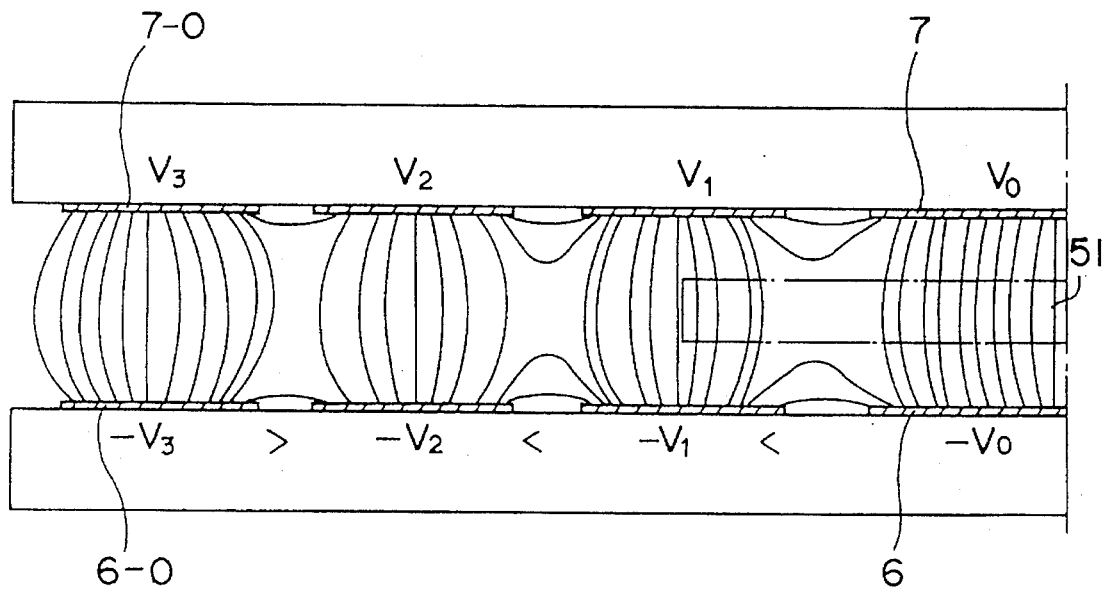
FIG. 7 is a diagram showing distribution of lines of electrical force between electrodes.

Specific behaviors of the varying apparent mass are explained below with reference to FIGS. 6 and 7. FIG. 6 shows voltages applied to respective electrodes of a capacitor composed of upper and lower electrodes each divided into a plurality of sectors and located above and below the conducting slab 51. FIG. 7 shows lines of electrical force produced by the applied voltages across the upper and lower electrodes of a left half of the capacitor of FIG. 6. Assume that $\pm V_0$ is applied across the upper and lower electrodes located in the center, $\pm V_1$ across those outside the central ones, $\pm V_2$ across the next ones, and $\pm V_3$ across the outermost ones, with the relation of $V^0 > V^1 > V^2 < V_3$. Then the lines of electrical force produced between the upper and lower electrodes are dense across the electrodes with $\pm V_0$ and $\pm V_2$ voltages applied, and thin across those between them.

The lateral force imparted on the mass 51, i.e. the conducting slab, inserted in this system depends on distribution of voltages applied across the upper and lower electrodes and on the position of the mass 51. That is, the conducting slab 51 is pulled to regions with higher densities of lines of electrical force and stops at an equilibrium position. The mass 51, at rest, is held by a spring force between the central electrodes. If lateral vibrations are imparted to the mass 51, the mass 51 slightly comes out of the equilibrium position; however, forces due to voltages applied across the electrodes behave to pull or push the mass 51 to restore it to the equilibrium position, thus establishing a stiff spring.

The magnitudes of the forces behaving to restore the mass 51 to the equilibrium position depend directly on magnitudes of applied voltages. In this particular example, the potentials on the top and bottom electrode plates are of opposite polarities, and voltages applied across the respective electrode pairs produce an electric field varying in the lateral direction. The mass is pulled to regions of higher and higher field density in order to decrease its potential energy in the electric field. When the mass moves in the electric field, it causes the external source to provide electric charge, i.e. additional energy, to keep the voltage constant, and the capacitances change.

Figure 8:
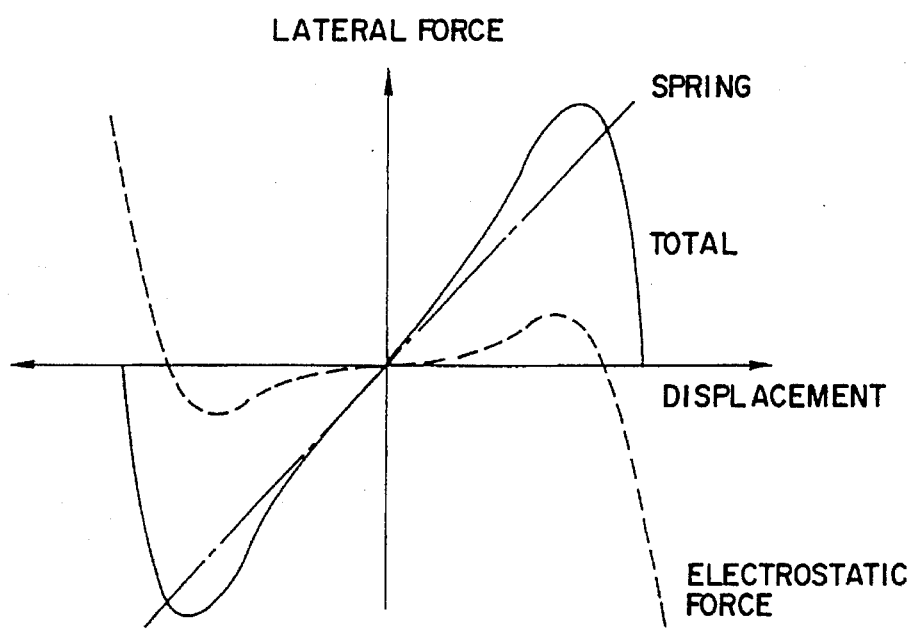
FIG. 8 is a diagram showing behaviors of the varying apparent mass accelerometer.

By accurate application of voltages to the electrodes, the mass 51 behaves as if it is in a lateral potential well. This force tends to maintain the mass 51 laterally centered. In this system, once the critical threshold is exceeded, it has the effect of causing the mass 51 to move away from the center position. The desired overall effect is illustrated in FIG. 8.

Discussed below is whether the foregoing assumption is valid or not. Assume that the length of the electrode plates L is 10 μm, the vertical electrode spacing d is 2.5 μm, the thickness a of the conducting slab is 2.0 μm, and the area A of each electrode plate is 0.09 cm$^2$. These values make it possible to use micromachining techniques to realize the varying apparent mass accelerometer. Substituting these values into Equation (3) results in the lateral force Fx being 6.37·V$^2$(μN). When a silicon plate is used as the conducting slab 51, since the density of silicon is 2.33 g/cc, the mass of the plate is 41.94 μg, and the acceleration acc due to the applied voltage is 152·V$^2$(m/sec$^2$).

This is an acceleration of 15.4 G when a voltage of 1 V is applied across the electrodes. Since this acceleration is 1/75 with respect to 200 gal, the desired external force can be obtained by choosing an appropriate value of applied voltage.

The principle explained above provides a varying apparent mass accelerometer feasible as an accelerometer for detecting earthquakes.

Figure 1:
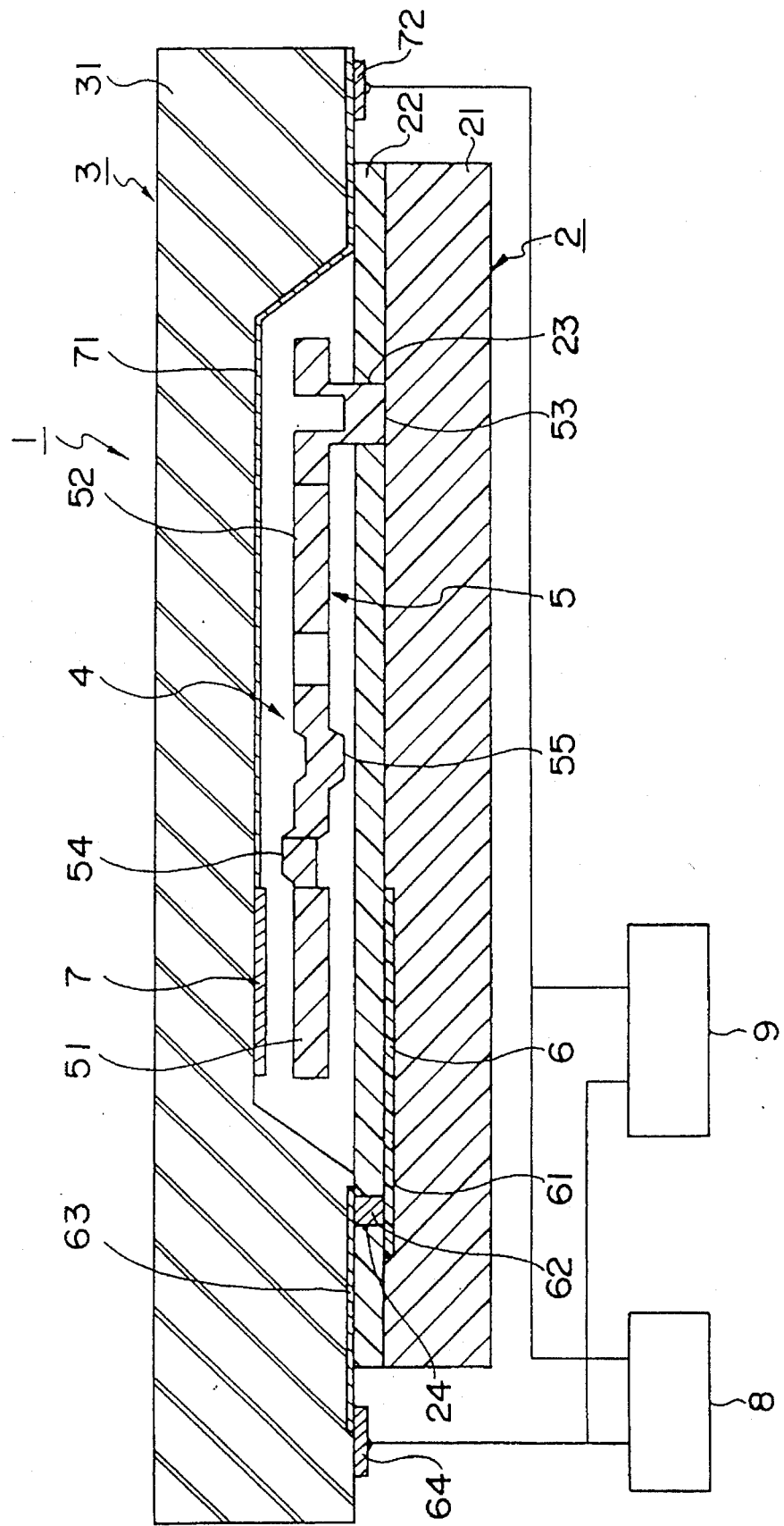
FIG. 1 is a cross-sectional view showing a concept of construction of a varying apparent mass accelerometer according to the invention.
Figure 2:
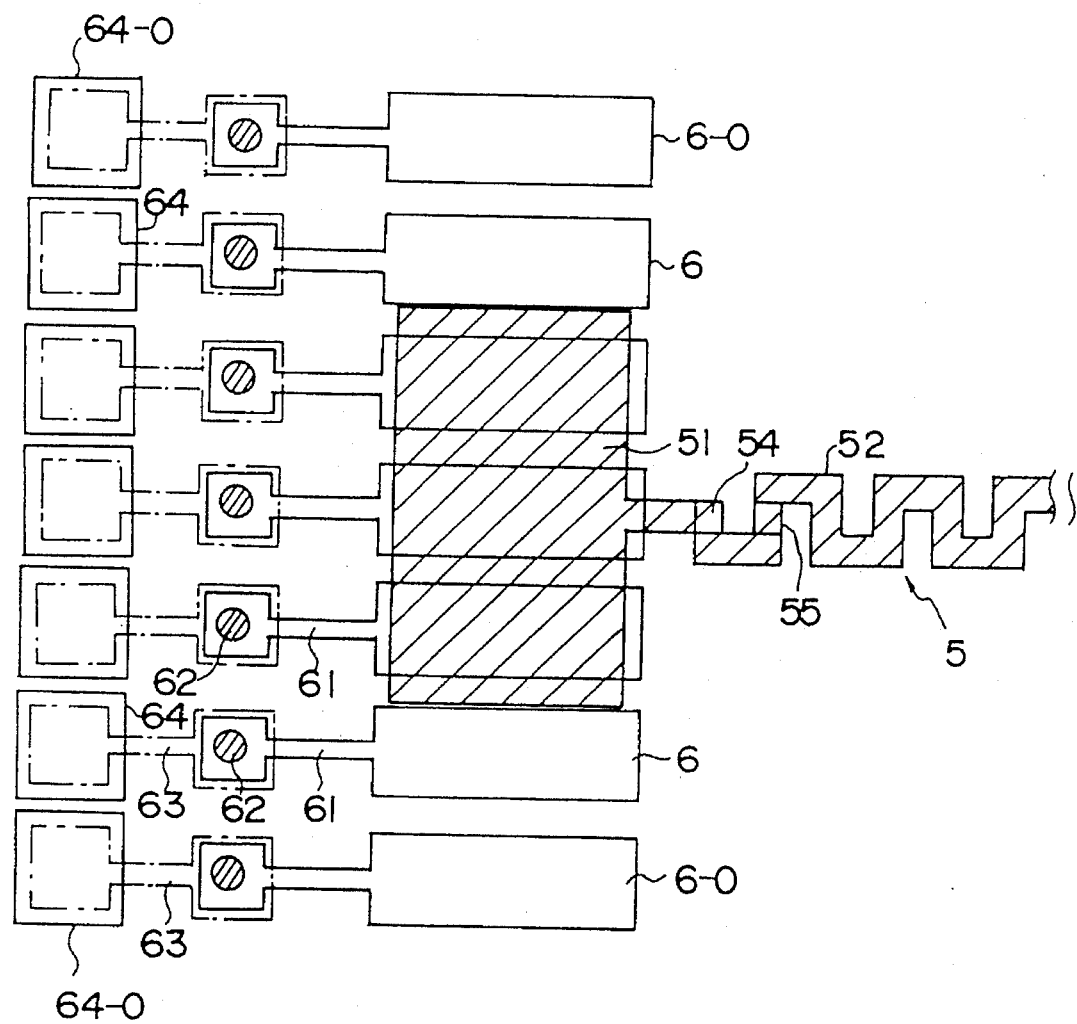
FIG. 2 is a plan view showing a positional relationship between electrodes and a mass in the varying apparent mass accelerometer according to the invention.
Figure 3:
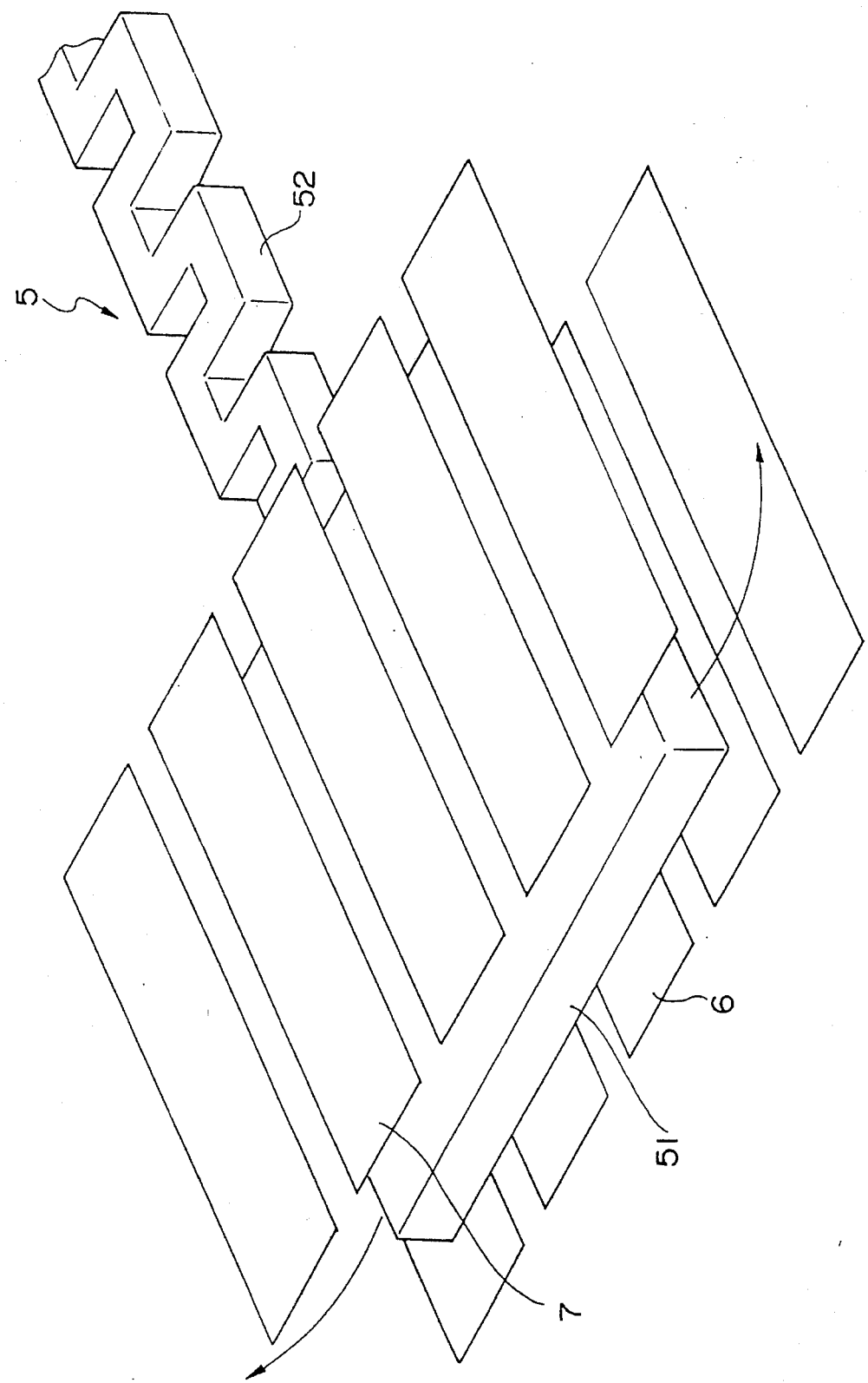
FIG. 3 is a perspective view showing a concept of construction of the varying apparent mass accelerometer according to the invention.
Figure 4:
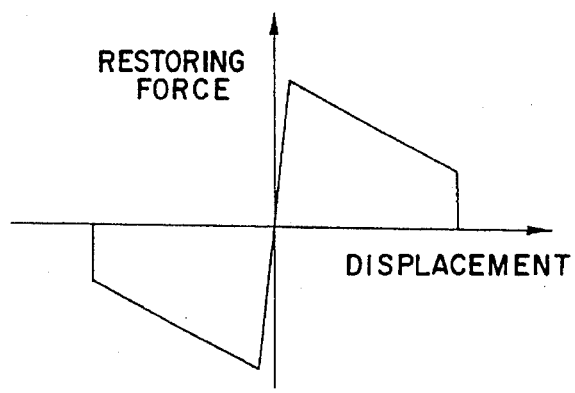
FIG. 4 is a diagram showing an ideal motion of the mass and spring system.

A varying apparent mass accelerometer using the principle according to the invention is explained below with reference to FIGS. 1 to 3. FIG. 1 is a cross-sectional view showing construction of the varying apparent mass accelerometer, FIG. 2 is a top view schematically showing a positional relationship between electrodes and the mass in the accelerometer, and FIG. 3 is a perspective view schematically showing a relation between the electrodes and the mass in the accelerometer.

The varying apparent mass accelerometer 1 according to the invention includes a frame 2 made of a silicon plate with sectored lower electrodes 6, a cover plate 3 with sectored upper electrodes 7, and a pendulum 5 extending in a cantilevered fashion from the frame 1 in a space defined between the frame 1 and the cover plate 3.

The frame 2 is composed of a silicon plate 21 and an insulating layer in the form of a silicon nitride (SiN$_x$) film 22 grown on one surface of the silicon plate 21. Provided on the same surface of the silicon plate 21 under the silicon nitride film 22 are lower electrodes 6 and lower electrode leads 61 by diffusing an impurity in a predetermined pattern. Distal ends of the lower electrode leads 61 are expanded to behave as coupling regions from which electrode leads 62 extend through contact holes 24 formed in the silicon nitride film 22.

The cover plate 3 may be made of glass 31, for example. The cover plate 3 has a cavity 4 along its lower surface. Provided on the inner surface of the cavity 4 are upper electrodes 7 from which upper electrode leads 71 extend along the inner surface of the cavity 4 and the lower surface of the cover plate 3. Also provided on the lower surface of the cover plate 3 are lower electrode leads 63. These electrodes and leads are provided by first depositing metal on the surfaces and then etching the metal layers in predetermined patterns.

The lower electrodes 6 are introduced to the exterior and connected to external electrodes 64 via the lower electrode leads 61 provided under the silicon nitride film 22, electrode leads 62 passing through the silicon nitride film 22, and lower electrode leads 63 in the form of metal films deposited on the lower surface of the cover plate 3. The upper electrodes 7 are introduced to the exterior and connected to the external electrodes 72 via the upper electrode leads 71 provided along the inner surface of the cavity 4 and the lower surface of the cover plate 3. These leads 61, 62, 63, external electrodes 64, leads 71 and external electrodes 72 are in the number corresponding to the number of the sectored electrodes.

The pendulum 5 is made by etching a polysilicon layer grown on the silicon plate 21. The pendulum 5 includes a mass 51, a zig-zag spring 52, and an anchor 53 which all are integral. The anchor 23 passes through an anchor hole 53 made in the silicon nitride film 22 and fixed to the silicon plate 21. The pendulum 5 has a cantilevered structure, and the zig-zag spring 52 supporting the mass 51 permits a necessary amount of displacement of the mass 51 on a plane in the direction in which earthquake waves vibrate. The zig-zag spring 52 has an upper projection 54 and a lower projection 55 made by jutting up and down parts of the spring near the mass 51 so as to ensure proper swinging movements of the mass 51 by preventing the mass 51 from touching the upper electrode 7 and the underlying insulating layer 22 or from being immovably attracted to the electrodes even when vibrating up and down.

Coupled to the electrodes 64 and 72 are power sources 8 to apply predetermined voltages to the respective electrodes pairs to produce desired magnitudes of attractive force between electrodes of the respective electrode pairs. Magnitudes of such attractive force are chosen to exhibit a predetermined pattern so as to locate the mass 51, at rest, between the central electrodes and locate it between the outermost electrodes when the acceleration exceeds the threshold. Therefore, when the acceleration exceeds the threshold, the mass 51 is trapped between the outermost electrodes 6-0 and 7-0, and makes it sure to detect that the acceleration has exceeded the threshold. A capacitance detector 9 is connected to the desired one of the electrode pairs, e.g. the outermost electrode 64-0 and the associated one of the external electrodes, 72-0 (not shown), among the electrode pairs 64 and 72. When the mass 51 moves and approaches the outermost electrode pair due to an earthquake wave, the capacitance of the capacitor made by these electrodes changes. By detecting this change in capacitance with the capacitance detector 9, occurrence of an earthquake is detected.

In the foregoing explanation, earthquake waves were taken as vibrating waves to be detected; however, such waves to be detected are not limited to earthquake waves but apparently may be other vibrating waves. The foregoing embodiment detects the excess of the acceleration over the threshold value by using means for detecting changes in capacitance; however, this means may be replaced by other means for optically or magnetically detecting positional changes of the mass 51.

Explained below is one possible process for fabricating the varying apparent mass accelerometer according to the invention with reference to FIGS. 9A to 9E, FIGS. 10A to 10E and FIGS. 11A to 11E. Although some of films or layers are simultaneously deposited on both upper and lower surfaces of the silicon wafer in the actual process, those on the lower surface are omitted from the following explanation and the corresponding drawings.

Figure 9A:
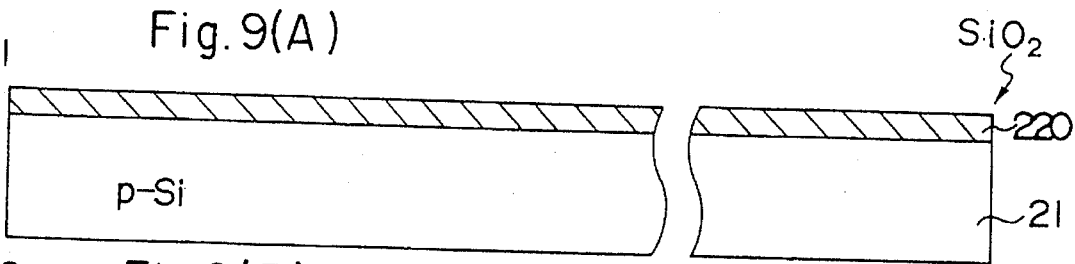
FIGS. 9A to 9E are diagrams showing a process sequence for manufacturing the varying apparent mass accelerometer according to the invention.

A polished surface of a p-type silicon plate 21 is thermally oxidized to form an oxide film ($SiO_2$) 220 over the entire surface of the silicon plate 21 (FIGS. 9A).

Figure 9B:
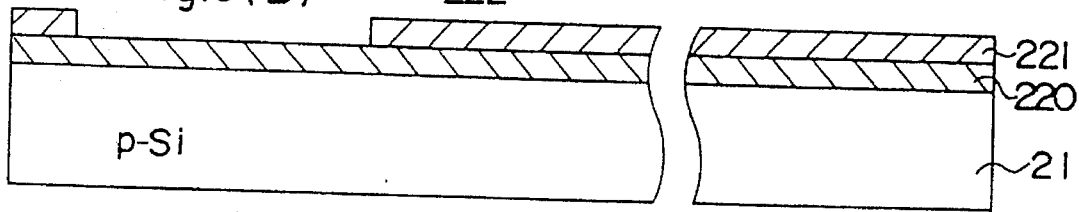

A photoresist layer 221 is provided first on the entire surface of the oxide film 220, and then partly removed by exposure and development to form a mask 222 for making lower electrodes (FIG. 9B).

Figure 9C:
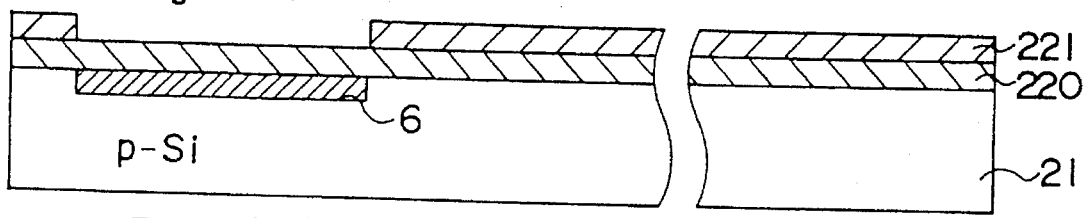

An impurity ($p^+$: phosphorus) is implanted and thermally diffused into the silicon plate 21 through the mask 222 to make the lower electrodes 6 (FIG. 9C).

Figure 9D:
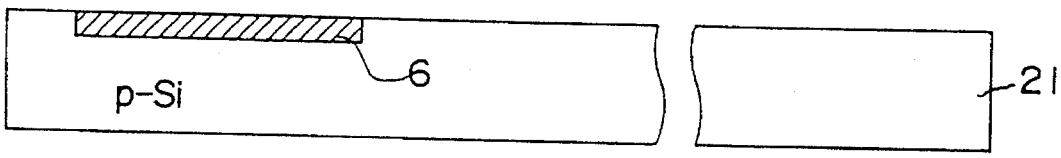

The photoresist layer 221 is then removed, and the oxide film 220 is also removed by etching using hydrogen fluoride (FIG. 9D).

Figure 9E:
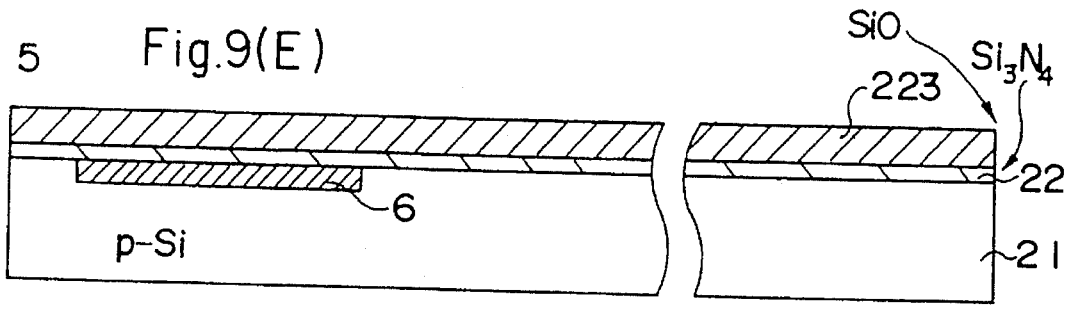

A silicon nitride ($SiN_x$) layer 22 is next deposited by chemical vapor deposition (CVD) on the surface of the silicon plate 21 including the lower electrodes 6, and a 4000 Å thick oxide film 223 is deposited by CVD on the silicon nitride layer 22 (FIG. 9E).

After a Photoresist film is applied on the oxide film 223, an oxide removing mask 224 is made, and the oxide film 223 is etched by 1500 Å using buffered hydrogen fluoride. This forms a projection 54-1 on the oxide film 223 for making the upper projection 54 (FIG. 10A) in the subsequent polysilicon layer.

Figure 10A:
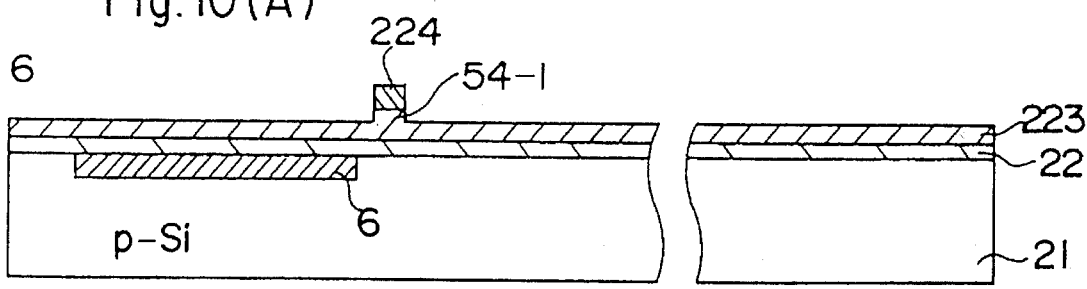
FIGS. 10A to 10E are diagrams showing a process sequence subsequent to that of FIGS. 9A to 9E for manufacturing the apparent mass accelerometer according to the invention.
Figure 10B:
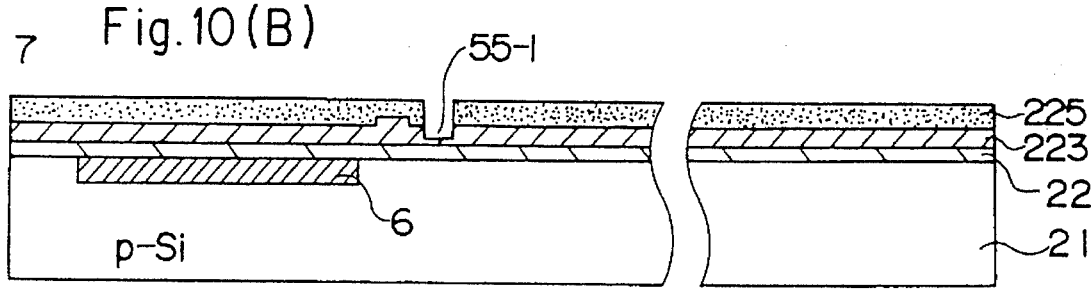

Next, after the mask 224 is removed, a photoresist film is again provided on the etched oxide film 223, and an oxide removing mask 225 is made. Then, as in the former process sequence, the oxide film 223 is etched by 1500 Å by using buffered hydrogen fluoride to make a recess 55-1 for the lower projection 55 (FIG. 10B).

Figure 10C:
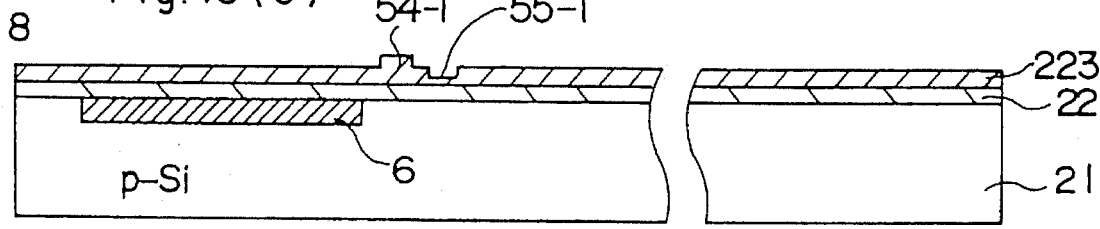

After that, the oxide removing mask 225 is removed to expose the sacrificial layer having the projection 54-1 and the recess 55-1 (FIG. 10C).

Figure 10D:
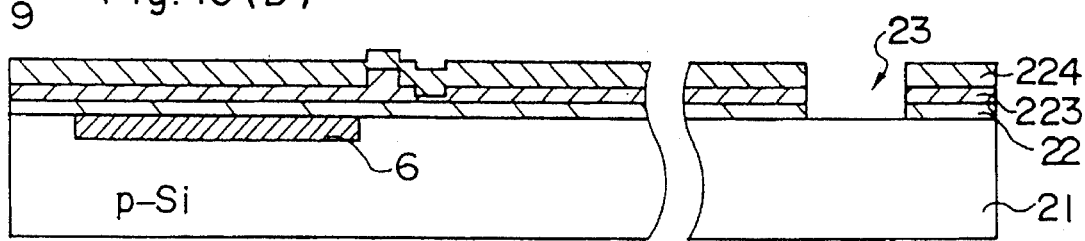

A photoresist layer 224 is deposited on the entire surface of the oxide film 223 and partly removed by exposure and development to form a mask for making anchor holes. By using this mask, the oxide film 223 and the silicon nitride film 22 are etched until exposing the silicon plate 21, thus making the anchor holes 23 (FIG. 10D). The photoresist 224 is removed.

Figure 10E:
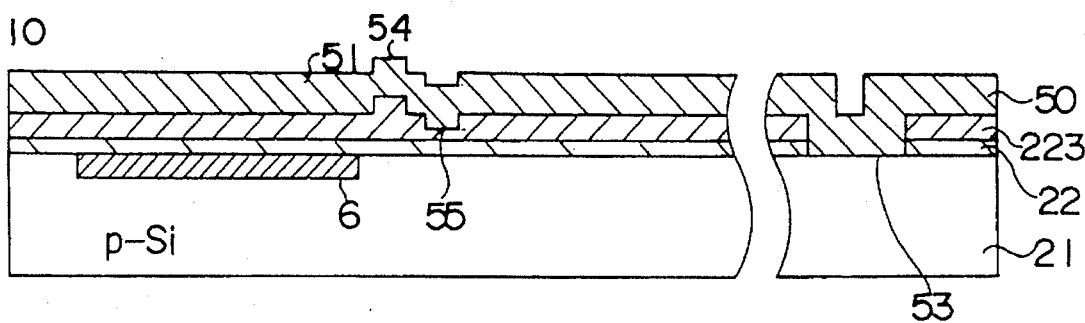
Figure 12:
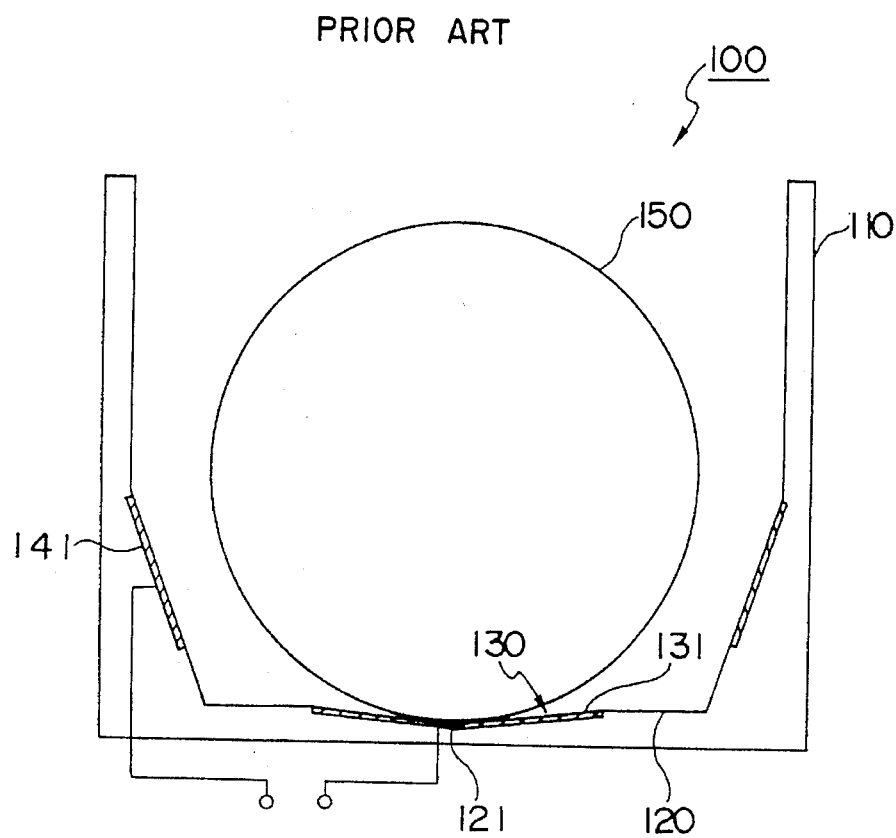
FIG. 12 is a diagram showing the principle of an existing accelerometer.
Figure 13:
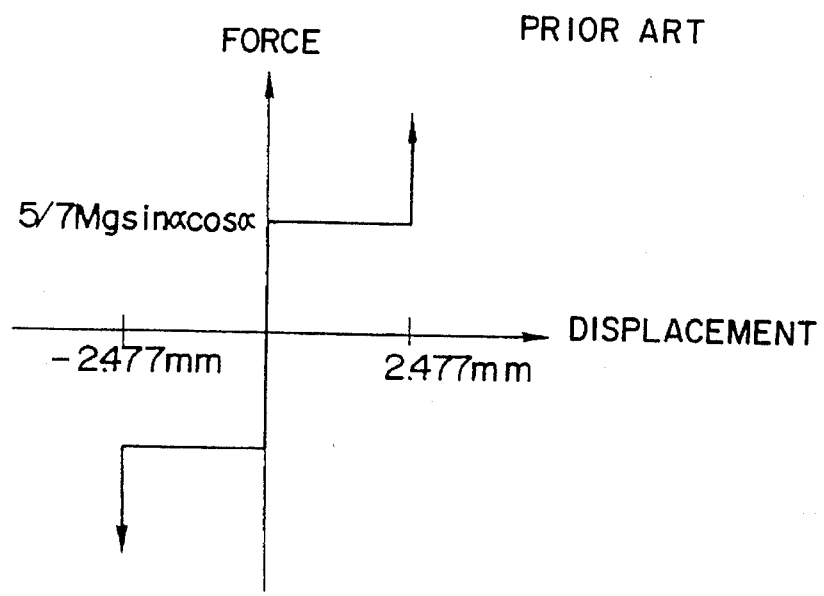
FIG. 13 is a diagram showing behaviors of the existing accelerometer.

By uniformly growing polysilicon on the surface of the oxide 223 and in the anchor holes 23, a polysilicon layer 50 is obtained, which includes anchors 53 extending through the anchor holes to the silicon plate 21. As a result, the upper projection 54 is made on the projection 54-1, and the lower electrode 55 on the recess 55-1 (FIG. 10E).

Photoresist is deposited on the entire surface of the polysilicon layer 50 and then partly removed by exposure and development to make a pattern for the mass 51 and the spring 52. After the polysilicon layer 50 is partly removed by etching to form the mass 51 and the spring 52, the photoresist is removed (FIG. 11A).

After that, part of the oxide film 223, i.e. the sacrificial layer, except for the part underlying the mass 51 and the spring 52 is removed by using buffered hydrogen fluoride (FIG. 11B). Then, the silicon nitride film 22 is partly removed by a known method to form contact holes 24 for access to the lower electrodes 6 (FIG. 11C).

A metal layer of Au or other metal is provided on the silicon nitride film 22 and in the contact holes 24, and then patterned and etched to make the electrode leads 62 (Fig. 11D). The remaining part of the oxide film 223 is then removed by using buffered hydrogen fluoride (FIG. 11E). After these steps, the structure 2 forming a major part of the varying apparent mass accelerometer according to the invention is obtained.

By mounting the cover plate 3 with upper electrodes on this structure 2 by anodic bonding, the varying apparent mass accelerometer 1 is obtained. Upper electrodes must be passivated or mass will bond to cover.

As described above, the invention provides a varying apparent mass accelerometer with varying apparent mass, which has a low sensitivity to accelerations below the threshold but becomes quite sensitive to accelerations above the threshold to reliably detect corresponding vibrations. Further, such accelerations can be detected with quite a small displacement of the mass.

In addition, the invention provides a miniaturized, inexpensive and power-saving earthquake accelerometer, having the sensitivity to accelerations of 85 to 150 Gal for frequencies between 1 and 5 Hz, and a roll-off of approximately 60 dB per decade for frequencies above 5 Hz.

Furthermore, the invention provides a reliable earthquake accelerometer which exerts a detection signal only when accelerations exceed a threshold.

What is claimed is:

1. A varying apparent mass accelerometer, comprising:

a frame vibrating with a vibrating wave;

a mass supported on said frame via a spring;

electrodes disposed above and below said mass;

power sources for applying voltages to said electrodes;

means for detecting the position of the mass when the mass is moved beyond a threshold by an exceeded vibration force; and wherein the upper and lower electrodes are each divided into a plurality of sectors of electrode plates located in respective pairs above and below the electrode plates, and wherein a voltage V0 is applied across a center one of said pairs, a voltage V1 is applied across a second one of said pairs which is adjacent said center one of said pairs, a voltage V2 is applied across a third one of said pairs which is adjacent said second one of said pairs, and a voltage V3 is applied across a forth one of said pairs which is outside of said center, second and third pairs, and wherein V0>V1>V2<V3.

2. A varying apparent mass accelerometer, comprising:

a frame vibrating with a vibrating wave;

a mass supported on said frame via a spring;

electrodes disposed above and below-said mass;

power sources for applying voltages to said electrodes;

means for detecting the position of the mass when the mass is moved beyond a threshold by an exceeded vibration force; and wherein the potentials on the top and bottom electrodes are of opposite polarities, and voltages applied across respective upper and lower electrode pairs vary in a lateral direction.

3. A varying apparent mass accelerometer according to claim 2, including means for establishing magnitudes of attractive forces based on said voltages applied which exhibit a pattern so as to locate the mass, at rest, between central ones of the electrodes, and to locate the mass between outermost electrodes when the acceleration exceeds the threshold.

* * * * *